United States Patent
Becker et al.

(10) Patent No.: US 6,259,228 B1
(45) Date of Patent: Jul. 10, 2001

(54) BATTERY PACK AND PROTECTIVE POUCH THEREFOR

(75) Inventors: Thomas P. Becker, Kenosha, WI (US); Bryan L. Doyle, Wadsworth, IL (US); Daniel M. Eggert, Kenosha, WI (US); Gordon A. Putney, Lake Geneva, WI (US); Richard W. Prince, Kenosha, WI (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/502,872

(22) Filed: Feb. 11, 2000

(51) Int. Cl.[7] ....................................................... H02J 7/00
(52) U.S. Cl. ............................................ 320/107; 320/105
(58) Field of Search ..................................... 320/105, 107

(56) References Cited

U.S. PATENT DOCUMENTS

| | | | |
|---|---|---|---|
| D. 364,602 | 11/1995 | Qualls et al. ........................ D13/112 |
| D. 374,859 | 10/1996 | Guay et al. ........................... D13/110 |
| 4,037,720 | * 7/1977 | McGurk ................................ 206/702 |
| 4,902,955 | 2/1990 | Manis et al. .......................... 320/105 |
| 4,983,473 | 1/1991 | Smith .................................... 429/48 |
| 5,077,513 | 12/1991 | Dea et al. ............................. 320/115 |
| 5,083,076 | 1/1992 | Scott .................................... 320/105 |
| 5,108,848 | 4/1992 | Kramer ................................. 429/9 |
| 5,194,799 | 3/1993 | Tomantschger ...................... 320/103 |
| 5,214,368 | 5/1993 | Wells ................................... 320/105 |
| 5,367,243 | 11/1994 | Wells et al. ........................... 320/105 |
| 5,378,554 | 1/1995 | Moses .................................. 320/107 |
| 5,589,292 | 12/1996 | Rozon .................................. 429/170 |
| 5,793,185 | 8/1998 | Prelec et al. .......................... 320/104 |
| 5,806,740 | * 9/1998 | Carlson ................................. 224/628 |
| 6,002,235 | * 9/1999 | Clore ..................................... 320/105 |
| 6,090,502 | * 11/1999 | Ingram et al. ......................... 429/65 |
| 6,126,608 | * 5/1999 | Kemme et al. ....................... 600/459 |
| 6,130,519 | * 9/1999 | Whiting et al. ....................... 320/105 |

OTHER PUBLICATIONS

Snap–on Tools Company Catalog page for TQJE930 Holster, pre–1999.

* cited by examiner

*Primary Examiner*—Peter S. Wong
*Assistant Examiner*—Pia Tibbits
(74) *Attorney, Agent, or Firm*—Seyfarth Shaw

(57) ABSTRACT

A protective housing for a jump-starting battery pack includes a flexible sheet of multi-layered, electrically insulating fabric material including inner and outer nylon layers and a foam padding layer sandwiched therebetween adapted to be folded around the case of a battery pack positioned in the middle of the sheet and held closed by Velcro-type closures. Retaining straps secure the battery pack in place, one of the straps having stacks of secured-together folds positioned on opposite sides of the case to provide supports on which the connector clamps of the battery pack jumper cables can be clamped, with the cables projecting from the open top of the housing to serve as handles.

18 Claims, 3 Drawing Sheets

BATTERY PACK AND PROTECTIVE POUCH THEREFOR

BACKGROUND

This application relates to protective enclosures for tools and equipment and, in particular, to portable enclosures. The invention relates in particular to jump-starting battery packs of the portable type and protective enclosures therefore.

It is known to provide battery packs for the purpose of jump-starting internal combustion engines. Such packs typically include one or more storage battery cells and suitable electronics housed in a case, from which project a pair of jumper cables, each with a standard connector clamp at its distal end for attachment to the terminals of an automotive battery. The battery pack is typically rechargeable. Since the connector clamps are "live," i.e., directly connected to the terminals of the storage battery, it is important that they be maintained electrically insulated and isolated from each other and from nearby electrical conductors, when not in use. It is also useful to have a convenient means for carrying the battery pack without jeopardizing the insulation and isolation of the connector clamps.

It is known to provide various types of carrying cases, holsters and the like for various types of tools and electronic equipment. Prior electronic equipment cases have typically been designed to simply provide a means for transporting the equipment and many such devices completely enclose the equipment. While this is useful for maximizing protection of the equipment, it also impairs access to parts of the equipment, such as the recharging jack of the battery pack case.

Housings have heretofore been provided for jump-starting batteries or battery packs with provision for separating or isolating the battery cable clamps from each other, but these prior techniques have involved rigid housings which are relatively bulky and do not provide complete insulation of the connector clamps.

SUMMARY

There is described an improved housing arrangement for a portable battery pack which avoids the disadvantages of prior housing arrangements while affording additional structural and operating advantages.

An important feature is the provision of a housing which is of light weight and is easily transported.

In connection with the foregoing feature, another feature is the provision of a housing of the type set forth, which is of simple and economical construction and effectively insulates the connector clamps of the jumper cables from each other and from adjacent objects.

Another feature is the provision of a housing of the type set forth which permits access to portions of the battery pack case, for recharging or the like, without opening the housing.

In connection with the foregoing features, another feature is the provision of a housing of the type set forth, which is in the nature of a flexible and foldable sheet which can be wrapped around the battery pack case and the connector clamps.

Still another feature is the provision of a jump starter assembly including a battery pack and a housing therefor of the type set forth.

Certain ones of these and other features are attained by providing a protective housing for a battery pack having two jumper cables with connector clamps, the housing comprising: a flexible foldable sheet of protective material, retaining structure on the sheet for retaining an associated battery pack thereon, two clamp supports on the sheet respectively engageable with the clamps of an associated battery pack for supporting the clamps out of contact with each other, the sheet being shaped and dimensioned to be foldable around an associated battery pack in a closed condition completely encircling the battery pack, and a closure structure for holding the sheet in its closed condition.

The subject matter sought to be protected consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the described subject matter.

BRIEF DESCRIPTION OF THE DRAWINGS

For the purpose of facilitating an understanding of the subject matter sought to be protected there is illustrated in the accompanying drawings an embodiment thereof, from an inspection of which, when considered in connection with the following description, the subject matter its construction and operation, and many of its advantages should be readily understood and appreciated.

DETAILED DESCRIPTION

Figure 1:
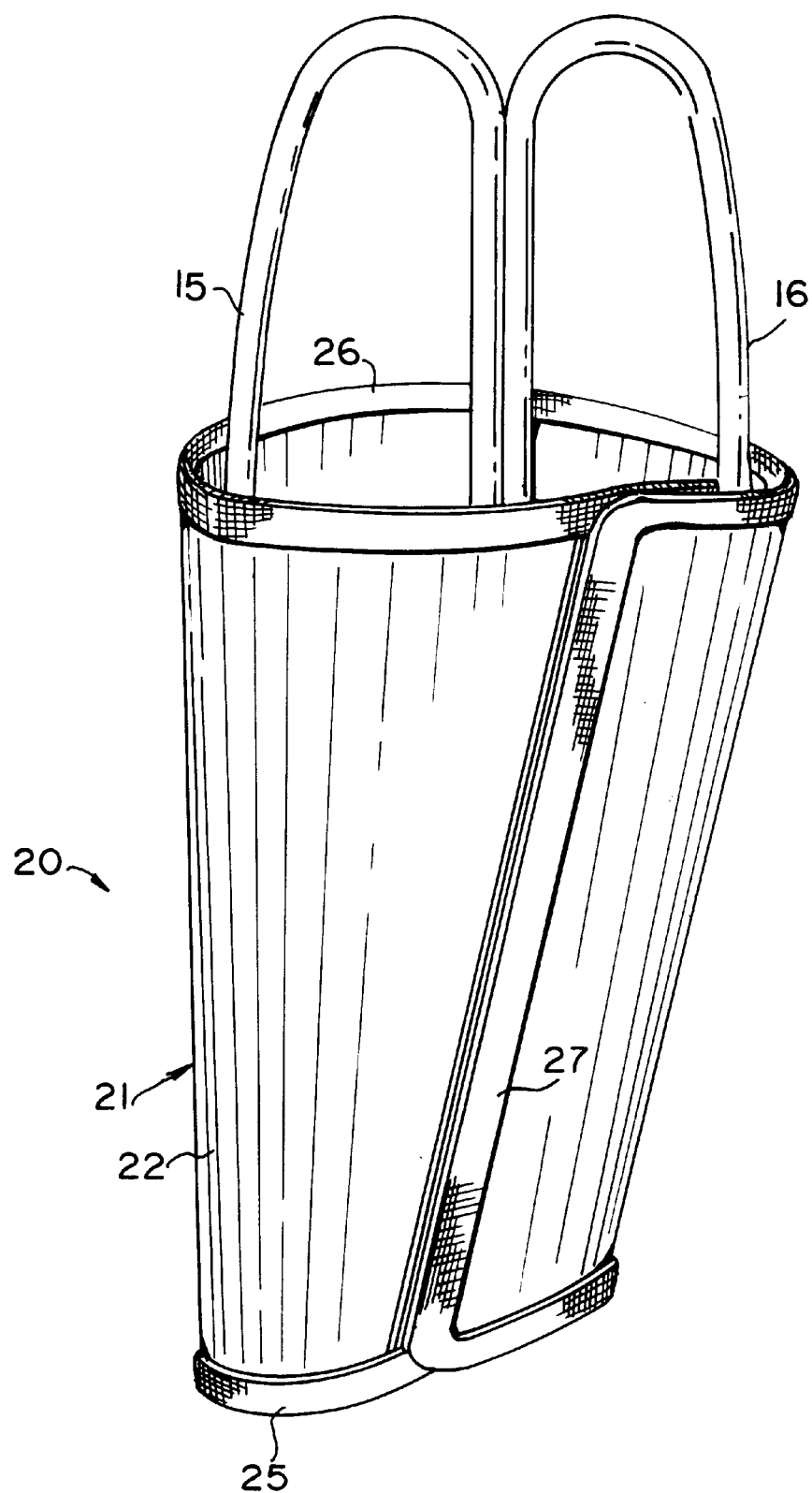
FIG. 1 is a perspective view of a housing shown in its closed condition enclosing an associated battery pack case.

Referring to FIGS. 1–4, there is illustrated a battery pack 10, disposed within a housing or pouch 20. The battery pack 10 is of known construction and includes a battery designed for jump-starting automotive vehicles. The battery is preferably a lead-acid battery and may be of the thin metal film type. The battery and associated electronics are disposed within a box-like case 11, having a control panel 12 for providing a user interface with the electronics. The battery pack 10 may be of the rechargeable type and the case 11 is provided with a charger jack 13 at the lower end thereof for receiving a mating plug of an associated battery charging unit, all in a known manner. The battery pack 10 has a pair of jumper cables 15 and 16 which are connected internally of the case 11 to the storage battery terminals and project from the upper end of the case 11, respectively terminating at connector clamps 17 and 18 (see FIG. 2) of standard type for coupling, respectively, to the battery terminals of an associated vehicle to be jump started, again all in a known manner.

Figure 6:
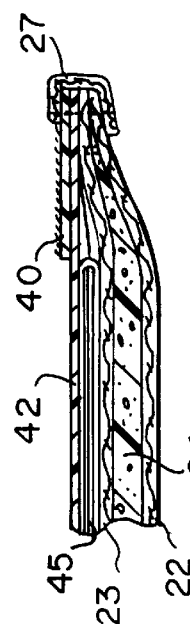
FIG. 6 is an enlarged, fragmentary sectional view taken generally along the line 6–6 in FIG. 2.

The housing 20 is in the form of a multi-layered sheet 21 of fabric material, which is generally trapezoidal in shape. Referring to FIG. 6, the sheet 21 has outer and inner electrically insulating and wear-resistant layers 22 and 23 of a suitable fabric, such as nylon, having sandwiched therebetween a padding layer 24, which may be formed of a suitable foam, about one-eighth inch thick. The layers are stitched together along with a sturdy wear-resistant edging along the bottom and top edges 25 and 26 and the side edges 27 and 28. The sheet 21 has a height between the top and bottom edges 26 and 25 which may be slightly greater than the height of the battery pack case 11, and a width between the side edges 27 and 28 sufficiently great to permit the sheet 21 to be wrapped completely around the battery pack case 11, as will be explained more fully below. In this regard, it will be appreciated that the nature and thickness of the materials of the sheet 21 are such as to make it readily flexible and foldable.

Secured to the inner surface of the sheet 21 is a retaining assembly 30 in the nature of a series of straps or webs, which may be in the nature of heavy woven fabric straps formed of a suitable synthetic material, such as nylon or the like. More specifically, the retaining assembly 30 includes a pair of elongated base strips 31 extending from the bottom edge 25 nearly to the top edge 26, substantially perpendicular to both, and spaced apart a distance approximately equal to the width of the battery pack case 11. The base strips 31 are joined at their upper ends by a cross base strip 31a, all of the strips 31 and 31abeing fixedly secured to the sheet 21 by suitable means, such as stitching. The retaining assembly 30 also includes a lower strap 32 spanning the base strips 31 and having ends respectively secured, as by stitching, to the base strips 31. The lower strap 32 is joined to the sheet 21 at its bottom edge 25 by a pair of bottom straps 33 and 34 which extend substantially parallel to the base strips 31. The lower strap 32 and the bottom straps 33 and 34 all form bights of sufficient length to cooperate to form a receptacle to receive the lower end of the battery pack case 11 in a snug fit, the spacing between the bottom straps 33 and 34 permitting access to the charger jack 13. The bottom straps 33 and 34 may be joined by a short cross strap 35 to prevent the bottom straps from spreading apart. The lower strap 32 is positioned so that, when the battery pack is mounted in place, the lower strap 32 falls below the control panel 12 so as not to obscure it. The retaining assembly 30 also includes an upper strap 36 which spans the base strips 31 and forms a bight dimensioned to receive therebeneath the upper end of the battery pack case 11. The upper strap may be positioned so as not to interfere with operation of the control panel 12.

Figure 2:
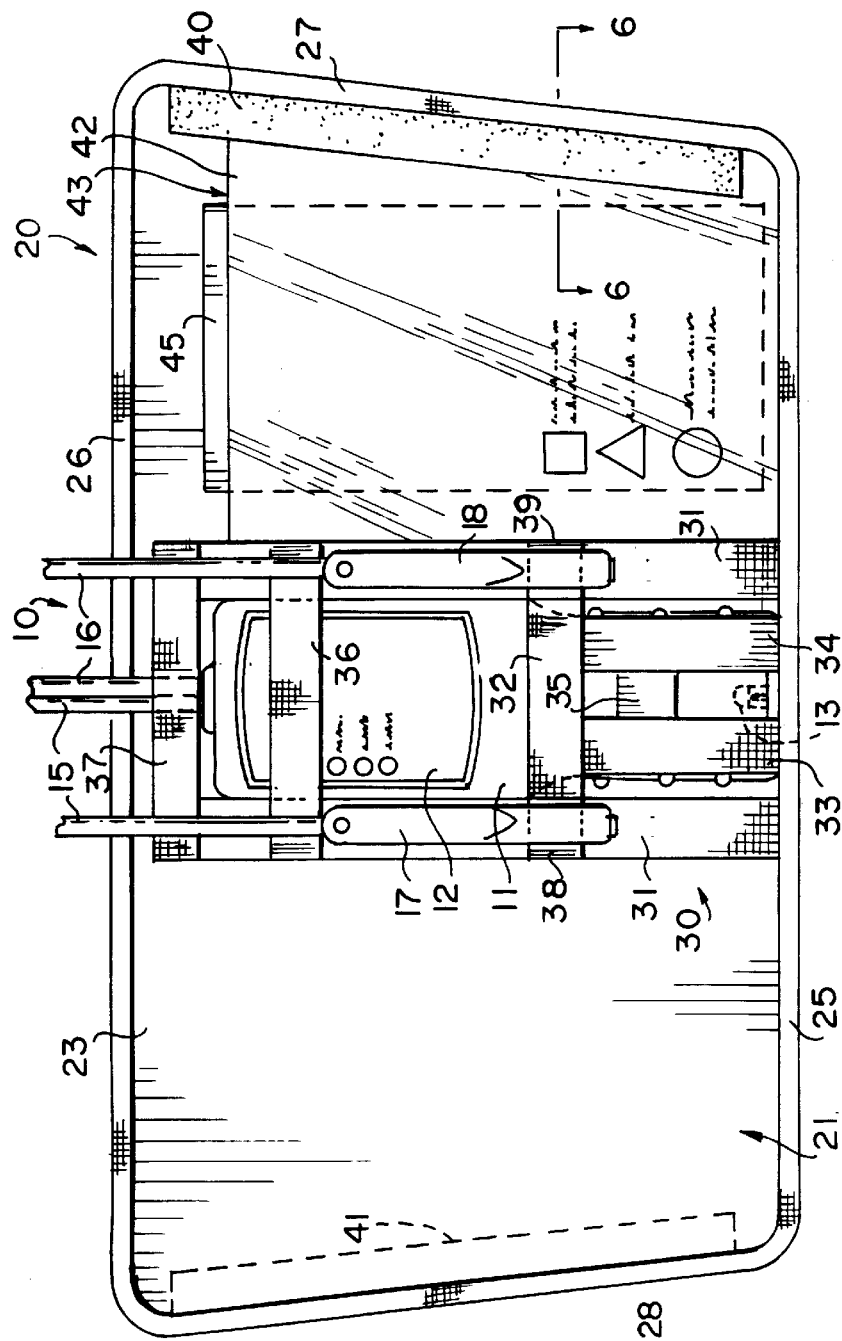
FIG. 2 is a slightly reduced, fragmentary, front elevational view of the housing and battery pack assembly of FIG. 1, with the housing in its open condition.

When the battery pack case 11 is seated in the retaining assembly 30 and bottomed against the bottom straps 33 and 34, as shown in FIG. 2, the jumper cables 15 and 16 extend upwardly beyond the top edge 26. In order to permanently secure the battery pack case 11 in the housing 20, the retaining assembly 30 also includes a cable strap 37 which spans the base strips 31 and extends over the lower ends of the jumper cables 15 and 16 to tightly hold them in place and prevent removal of the battery pack case 11 (see FIGS. 2 and 3).

Figure 5:
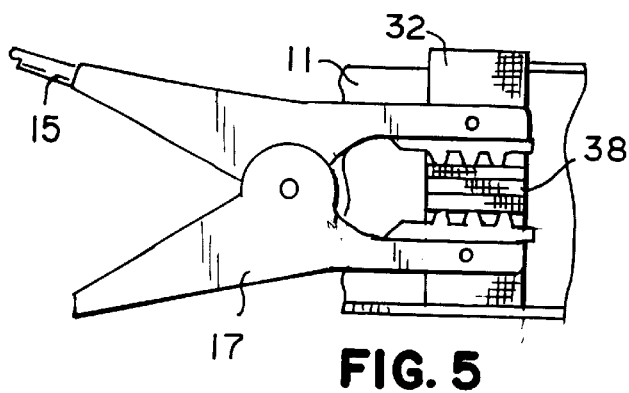
FIG. 5 is a fragmentary side elevational view of the assembly of FIG. 4 as viewed from the left-hand side thereof and with the clamp supported on a support lug.
Figure 3:
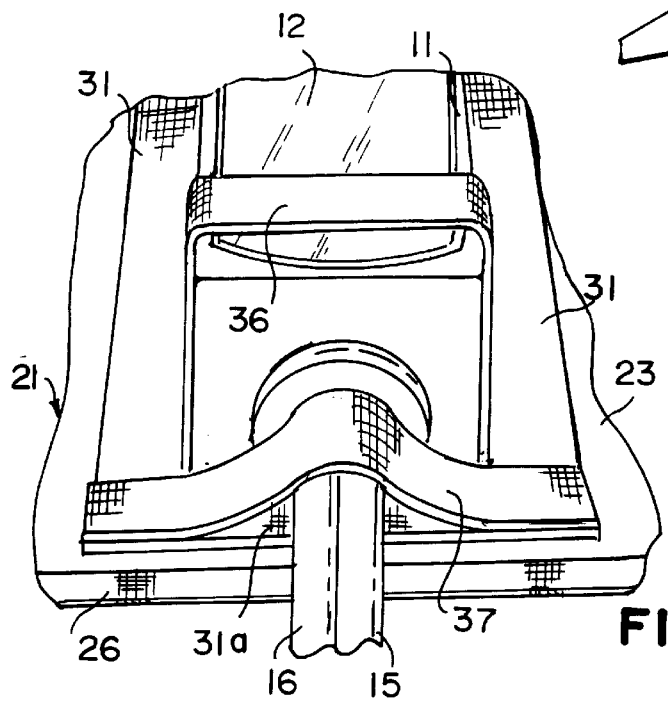
FIG. 3 is an enlarged, fragmentary, top perspective view of the assembly of FIG. 2.
Figure 4:
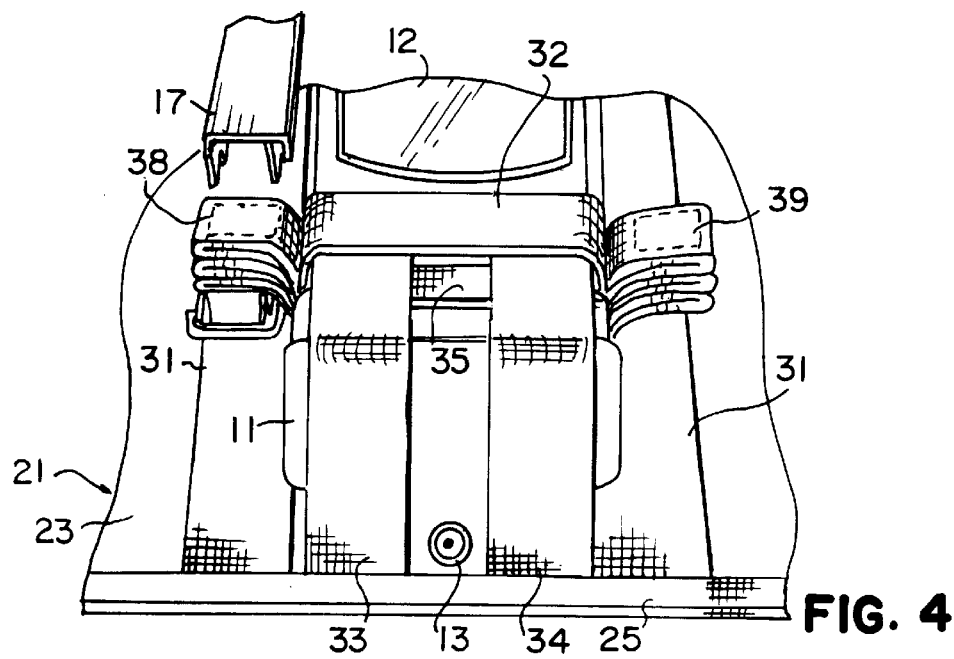
FIG. 4 is an enlarged, fragmentary, bottom perspective view of the assembly of FIG. 2 illustrating attachment of a connector clamp.

Referring in particular to FIGS. 2, 4 and 5, the lower strap 32 is provided adjacent to its opposite ends with stacks of folds stitched together so as to project laterally outwardly from the opposite sides of the battery pack case 11 to provide two clamp support lugs 38 and 39, onto which the two connector clamps 18 and 19 can be respectively clamped. It will be appreciated that when the connector clamps 17 and 18 are thus clamped onto the support lugs 38 and 39 they are isolated and insulated from each other, being separated by the battery pack case 11, thereby preventing accidental contact with each other which would short the battery.

When the battery pack 10 has thus been secured in place on the sheet 21 as shown in FIG. 2, the sheet 21 is folded around the battery pack case 11 and the clamps 17 and 18 so that the side edge 27 is folded over the side edge 28, completely encircling the battery pack case 11, as shown in FIG. 1. In order to hold the housing 20 in this closed condition, the sheet 21 is provided along the inner surface of the side edge 27 with a hook strip 40 and along the outer surface of the side edge 28 with a loop strip 41, of the type sold under the trademark VELCRO. The sheet 21 may also be provided with a sheet 42, formed of a suitable material which has a height less than that of the sheet 21 and is stitched in place between the side edge 27 and the right-hand one of the base strips 31, as viewed in FIG. 2. This sheet 42 cooperates with the inner nylon layer 23 to define a pocket 43 for receiving documentary material, such as an instruction or owner's manual 45 or instruction or safety card or the like.

It can be seen that when the housing 20 is disposed in its closed condition of FIG. 1, it isolates and insulates the connector clamps 17 and 18 from contact with any adjacent objects and also protects the battery pack case 11. The padding layer 24 provides shock buffering. The open bottom of the housing 20 permits access to the charger jack 13 without having to open the housing 20. The jumper cables 15 and 16 project out of the open top of the housing 20 and form loops which provide handles for ease of carrying the assembly.

When the battery pack 10 is in use, the housing 20 is opened flat, as in FIG. 2, and can serve as a built-in fender protector or engine compartment support that is readily identified as such. The battery pack 10 is permanently mounted in the housing 20 to ensure that any safety messages printed on the inside of the housing 20 are not separated from the battery pack 10 and to ensure that the electrical insulating and shock buffering characteristics of the housing 20 are not lost in the event that the user were to remove the battery pack 10. The sheet 42 may be formed of a material, such as that sold under the trademark TYVEK, so that indicia and messages can be printed directly thereon.

From the foregoing, it can be seen that there has been provided an improved battery pack and housing assembly which is of simple and economical construction, provides insulation and shock-buffering protection for the battery pack and effectively isolates the battery pack connector clamps from each other and from nearby objects during storage or transport.

While a particular embodiment of the present invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A protective housing for a battery pack having two jumper cables with connector clamps, the housing comprising:

a flexible foldable sheet of protective material, retaining structure on the sheet for retaining an associated battery pack thereon, two clamp supports on the sheet respectively engageable with the clamps of an associated battery pack for supporting the clamps out of contact with each other, the sheet being shaped and dimensioned to be foldable around an associated battery pack in a closed condition completely encircling the battery pack, and a closure structure for holding the sheet in its closed condition.

2. The housing of claim 1, wherein the retaining structure includes a plurality of straps.

3. The housing of claim 2, wherein the straps include a first laterally extending bight having ends secured to the sheet and a second longitudinally extending bight having an end secured to the sheet and an end secured to the first bight for cooperation therewith to define a receptacle for an associated battery pack.

4. The housing of claim 2, wherein the retaining structure includes a strap arranged to extend across an associated battery pack, the strap having two support portions each comprising a plurality of stacked folds secured together and providing a support on which a battery pack connector clamp can be clamped.

5. The housing of claim 1, wherein the sheet is formed of electrically insulating material.

6. The housing of claim 5, wherein the sheet is a multi-layered material including inner and outer layers of a wear-resistant fabric and an inner layer of foamed material for padding.

7. The housing of claim 1, wherein the retaining structure is disposed on a central section of the sheet, the sheet including end sections on either side of the central section arranged to be folded over an associated battery pack positioned on the central section.

8. The housing of claim 1, wherein the closure structure includes a Velcro-type hook strip and a Velcro-type loop strip adapted to be engaged with each other.

9. The housing of claim 1, wherein the sheet includes a pocket for receiving documentary material.

10. A portable jump starter assembly comprising:

a jump-starting battery pack including a case, a battery housed in the case and a pair of jumper cables connected to the battery and projecting from the case and each provided at a distal end with a connector clamp;

a flexible foldable housing adapted to receive the case and be folded therearound in a closed condition, the housing including retaining structure engageable with the case for retaining the case in place in the housing, two clamp supports respectively engageable with the clamps for supporting the clamps out of contact with each other, and closure structure for holding the housing in its closed condition.

11. The assembly of claim 10, wherein the retaining structure includes a plurality of straps.

12. The assembly of claim 11, wherein the retaining structure includes a strap arranged to extend across an associated battery pack, the strap having two support portions each comprising a plurality of stacked folds secured together and providing a support on which a battery pack connector clamp can be clamped.

13. The assembly of claim 10, wherein the housing is formed of an electrically insulating material.

14. The assembly of claim 10, wherein the retaining structure is disposed on a central section of the housing, the housing including end sections on either side of the central section arranged to be folded over an associated battery pack positioned on the central section.

15. The assembly of claim 10, wherein the housing in its closed condition has an open top through which the jumper cables project when the clamps are engaged with the clamp supports and the housing is retained by the retaining structure for providing handles for the assembly.

16. The assembly of claim 10, wherein the housing in its closed condition has an open bottom, the case including a charging jack which is accessible through the open bottom when the case is retained in the housing.

17. The assembly of claim 10, wherein the closure structure includes a Velcro-type hook strip and a Velcro-type loop strip adapted to be engaged with each other.

18. The assembly of claim 10, wherein the retaining structure nonremovably retains the case in the housing.

* * * * *